3,348,998
2,4,6 - TRICHLORO - PHENOXYACETYL N - METHYL AMPHETAMINE AND PRODUCTS CONTAINING SAME

Kenneth Eric Vincent Spencer, Emsworth, England, assignor to American Home Products Corporation, New York, N.Y., a corporation of Delaware
No Drawing. Filed June 3, 1965, Ser. No. 461,183
Claims priority, application Great Britain, Sept. 18, 1964, 38,118/64
5 Claims. (Cl. 167—65)

This invention relates to certain pharmaceutically useful amides, to compositions containing the amides and to processes for preparing them.

The invention provides compounds of the formula:

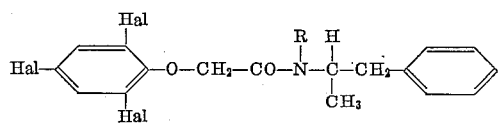

in which R is hydrogen or methyl and Hal is a halogen, preferably chlorine.

The invention also provides a process of preparing these compounds in which amphetamine or N-methyl amphetamine (β-phenylisopropylamine or N-methyl β-phenylisopropylamine respectively) is 2,4,6-trihalophenoxyacetylated, for instance using the appropriate acid, e.g. in the presence of bis-cyclohexyl carbodiimide, acyl halide, anhydride, ester e.g. p-nitrophenyl ester, ketene, azide, amide or by an exchange reaction between an amide of amphetamine or N-methyl amphetamine with the appropriate amide. Alternatively an N-(2-haloacetyl)-amphetamine or N-methyl amphetamine is condensed with a 2,4,6-trihalophenol, e.g. in the presence of a base.

The process of the invention using a 2,4,6-trihalophenoxyacetyl halide is conveniently carried out in the presence of a base which is stronger than these amines, preferably in the presence of a tertiary amine e.g. pyridine or a trialkylamine, for instance in a non-aqueous solvent, but it can be carried out for instance in the presence of a strong base such as sodium hydroxide, sodium carbonate or sodium acetate in water in a two phase system with the 2,4,6-trihalophenoxyacetyl halide and the amphetamine or N-methyl amphetamine in a water immiscible organic solvent, e.g. ether. However, it is preferred to carry out this reaction in a non-aqueous solvent in the substantial absence of water, alcohols or other materials which could enter into a side reaction with the 2,4,6-trihalophenoxyacetyl halide.

The compounds of the invention have anti-depressant activity as indicated by antagonism of the hypothermia caused by reserpine in mice, and also anti-inflammatory activity as shown by reduction of oedema of the rat's paw induced by the injection of kaolin. They are preferably obtained in a substantially pure state and in particular preferably do not contain more than 2% by weight and preferably not more than 0.5% of amphetamine of N-methyl amphetamine starting material because of the powerful psychomotor stimulant action of these amines.

The invention also provides pharmaceutical compositions containing in association with a pharmaceutically acceptable carrier a 2,4,6-trihalophenoxyacetyl amphetamine or N-methyl amphetamine. The compostions are preferably in unit dose form in which each dose unit contains from 10 to 500 mg. of the active amide.

The compositions of the invention conveniently contain the active amide in a unit dose of between 20 and 400 mg. and preferably in the range 50 to 250 mg.

A pharmaceutically acceptable carrier used in the composition of the invention can be solid or liquid. Solid compositions include powders, tablets, dispersible granules, capsules, cachets and suppositories. A solid carrier can be one or more substances which may also act as flavouring agents, binders or tablet disintegrating agents: it can also be an encapsulating material. In powders the carrier is a finely-divided active amide. In tablets the active amide is mixed with carrier having the necessary binding properties in suitable proportions and compacted in the size and shape desired. The powders and tablets preferably contain 5 or 10 to 99% of the active amide. Suitable solid carriers are magnesium carbonate or stearate, talc, sugar, lactose, pectin, dextrin, starch, gelatin, tragacanth, methyl cellulose, sodium carboxymethyl cellulose, a low melting wax and cocoa butter. The term "composition" is intended to include the formulation of the active amide with encapsulating material as carrier to give a capsule in which the active amide (with or without carriers) is surrounded by carrier, which is thus in association with it. Similarly, cachets are included.

Liquid form compositions include solutions, suspensions or emulsions. The active amide may be dissolved or suspended in a pharmaceutically acceptable liquid carrier, such as sterile water preferably containing a nonionic surface active agent such as the esters, e.g. fatty acid esters of polyhydroxy compounds, e.g. sorbitan, and particularly their polyethylene oxide derivatives, for instance Tween 80. It may be dissolved in an organic solvent or a mixture thereof and it may contain flavouring agents or other substances. Conveniently the composition is in a sterile form suitable for parenteral injection.

The active amide can be dispersed, e.g. dissolved in a suitable organic solvent, for instance aqueous propylene glycol or polyethylene glycol. In other instances compositions can be made by dispersing the finely-divided active amide in aqueous starch in sodium carboxymethyl cellulose solution or in a suitable oil, for instance arachis oil. Liquid pharmaceutical compositions which are sterile solutions or suspensions can be utilized by intra-muscular, intraperitoneal, subcutaneous or intravenous injection.

The composition is sub-divided in unit doses containing appropriate quantities of the active amide: the unit dose form can be a packaged composition, the package containing discrete quantities of composition, for example packeted powders or vials or ampoules. The unit dosage form can be a capsule, cachet or tablet itself, or it can be the appropriate number of any of these in packaged form.

The invention also includes the amides in the absence of carrier where the compounds are in unit dosage form.

The invention further includes a process in which the active amide is mixed with a pharmaceutically acceptable carrier and divided into unit doses to give a composition in accordance with the invention.

Example

A mixture of N-methyl amphetamine hydrochloride (16.5 g., 0.089 mole), 2 N-sodium carbonate solution (120 ml., 0.24 equiv.) and ether (80 ml.) was cooled and stirred during the adidtion of 2,4,6-trichlorophenoxyacetyl chloride (Hill, Towns and Senter, J. Amer. Chem. Soc., 1949, 71, 257) (24.4 g., 0.089 mole). The mixture was stirred for a further two hours after completion of the addition. After extraction with chloroform the product was distilled to give 2,4,6-trichlorophenoxyacetyl N-methyl amphetamine (N-methyl-N-1-methyl-2-phenylethyl)-2,4,6-trichlorophenoxyacetamide) (25.66 g.) B.P. 209°/0.3 mm.–218°/0.5 mm., $[a]_D^{23}+29.7$ (c.=2 in ethanol). Found: C, 56.16; H, 4.91; N, 3.34. $C_{18}H_{18}C_3NO_2$ requires C, 55.90; H, 4.69; N, 3.63%.

2,4,6-trichlorophenoxyacet'yl N-methyl amphetamine, was tested for anti-depressant activity by administration intraperitoneally as a micronized suspension in 1% aqueous Tween 80 or as a suspension in 1% aqueous carboxymethyl cellulose solution to mice whose temperature had been lowered by administration of reserpine. The oral dose of the compound was 50 mg./kg. and the rise in temperature was 9° C.

This compound was also administered orally in a dose of 250 mg./kg. to rats and then paw oedema was induced in them by injection of kaolin. There was a reduction in volume of the oedema formed compared with when there was no administration of the compound.

The intraperitoneal $LD_{50}$ of 2,4,6-trichlorophenoxyacetyl N-methyl amphetamine was >400 mg./kg. in mice.

Capsules of the active amide are made up by fiilling into hard gelatin capsules of suitable size, 20 mg. per capsule of the active amide and 150 mg. per capsule of lactose powder which had been mixed and sifted to 40 mesh. Tablets can aslo be used containing e.g. 15 to 25 mg. each of the active amide.

Each capsule or other unit dose form for clinical use preferably contains from about 10 to 30 mg. of the active amide for use as an anti-depressant. For use as an anti-inflammatory agent it may be made up to contain from less than 15 to 500 mg. or between 20, 25, 30, 40 or 50 mg. and 500 mg. as desired, preferably between 100 and 400 mg.

The active amide is preferably derived from d-amphetamine or d-N-methyl amphetamine. The corresponding dl- starting materials can also conveniently be used.

What is claimed is:
1. A pharmaceutical composition comprising 2,4,6-trichlorophenoxyacetyl N-methyl amphetamine and a pharmaceutically acceptable carrier therefor.
2. A composition according to claim 1 in unit dosage form, each dose unit containing from 10 to 500 mg. of the active amide.
3. 2,4,6 - Trichlorophenoxyacetyl N - methyl amphetamine.
4. The method of relieving depression in a mammal which comprises administering to said mammal a therapeutically effective dose of a composition according to claim 1.
5. The method of relieving inflammatory conditions in a mammal which comprises administering to said mammal a therapeutically effective dose of a composition according to claim 1.

References Cited

Shapiro et al.: Journal of the American Chemical Society, vol. 80, pp. 6065–6071 (1958).

ALBERT T. MEYERS, *Primary Examiner.*

SAM ROSEN, *Examiner.*

L. RANDALL, *Assistant Examiner.*